United States Patent Office 3,234,071
Patented Feb. 8, 1966

3,234,071
METHOD OF AND MEANS FOR PRODUCING OPENWORK STRUCTURES OF THERMOPLASTIC MATERIAL
William Thomas Ward, 156 Taylor St., Leicester, England, and John Arthur Hetherington, 7 Creacock Grove, Woodford Green, England
Filed May 25, 1959, Ser. No. 815,686
Claims priority, application Great Britain, May 27, 1958, 16,849/58
4 Claims. (Cl. 156—441)

This invention relates to methods of, and apparatus for, producing openwork structures, e.g. of tubular or web form made of extrudable thermoplastics such, for instance, as polyvinyl chloride, polyethylene, polypropylene and polyamides.

The invention is capable of most varied exploitation and in practice can be used to produce nets, bags, openwork webs, containers, and articles of wear and decoration, to mention but a typical few.

In addition to that of producing these openwork structures by efficient and progressive methods, an object of the invention is to allow for ready variation of the pattern of the product without complicated or expensive modification of the fabricating equipment—as will be explained below.

Stated, then, in general terms, the method of fabricating openwork structures of a thermoplastic, in accordance with the present invention, comprises the simultaneous extrusion of a plurality of separate streams of the thermoplastic in softened condition, and diverting or guiding at least some of said streams to bring about temporary contact and then parting between selected, constantly-changing pairs of said streams, so that the streams of each pair merge and unite integrally at their zones of contact, whereby the openwork structure is formed.

Stated in other terms, the principle lies in the extrusion of at least two sets of separate streams of the thermoplastic and the temporary and intermittent uniting of these streams with one another in constantly changing pattern by merging by contact when still in a plastic condition (e.g. at the normal extrusion temperature or by additional heating to compensate for any critical loss of heat after extrusion), to produce a coherent, patterned, skeleton structure on cooling. Where two streams come into contact, and then part again, a junction is produced between them which is a homogeneous and integral part of both.

In preferred arrangements, the thermoplastic streams are extruded in sets from at least two (e.g. parallel) sets of die orifices, and one at least of said sets is mechanically engaged and diverted outside said die orifices to bring about the required contacts between loose streams from these orifices.

This principle can be carried into effect in various ways, for example at least one of said sets of streams may be extruded from a set of die orifices moving relatively to the other set or sets of orifice(s) to displace its set of plastic streams and thereby effect or assist the change of contact between the streams.

The direction of relative movement between the sets of orifices can vary. For instance it may take the form of a continuously rotary motion, a circular reciprocating motion, or a rectilinear reciprocation. Further, the speed of this relative motion may be varied during a performance of the method, this, as will be appreciated, varying the section of stream between adjacent junctions and hence the pattern of the finished product.

These are not the only means by which the invention can be employed to produce openwork plastic structures of varied patterns and forms. The orifices referred to represent a plurality of extrusion nozzles and can be shaped to deliver plastic streams or strands of many cross sectional shapes and sizes, further conditioning the appearance of the final product. For many purposes circular sectioned monofilaments are favoured, but other sections which, for instance, are useful is a square section for producing decorative mesh similar to expanded metal, and oval and flat sections in applications such as basket weaves, where thicker sections are necessary. The system also allows for a considerable degree of variation in the pattern and form of the extruded work by means such for example as appropriate control of the temperatures of extrusion as between one set of orifices and another, by constrastingly directing the orifices of the two sets, and by varying the extrusion pressure.

Thus, for example, where there is a difference in temperature between the two sets of orifices there will be a difference in thickness between the two sets of streams or strands and a consequent biassing of the reticulations in the pattern. Again, by directing the orifices so that the streams of the two sets can be at an acute angle when they contact and merge, they will remain longer in contact and thicker or longer junctions or nodes will be produced.

Various forms of apparatus can be used to carry the methods of this invention into effect. In a generally preferred arrangement, however, the apparatus comprises at least two sets of extrusion orifices, and means spaced from said orifices and adapted to mechanically engage at least some of the streams therefrom and guide or divert them into contact with other streams.

These extrusion orifices could be provided in dies or other extrusion apparatus, for example with one set in one die, and a second in a second die, or both sets of orifices could, under appropriate conditions, be provided in the same die (see below).

In an advantageous and effective arrangement, however, use is made of two relatively movable dies each provided with a set of extrusion orifices, the orifices of the two sets being located alongside one another and aimed in the same general direction, and fixed diverting means spaced from the various dies in this general direction.

The apparatus used for carrying this version of the invention into effect may take various forms depending, for example, on whether a tubular or a web type of product is to be aimed at.

Thus, for instance, in an apparatus set up to produce a tubular product, the dies may be concentric and have an annular set of extrusion passages passing through each and terminating in orifices at the face of the die, and means provided for continuously or reciprocatingly rotating one of said dies whilst the other remains fixed.

Conveniently, in this latter arrangement, the dies form part of an extrusion head comprising an extrusion screw for for feeding plasticised material to said passages and orifices through an annular chamber in advance of said dies in the head, and the inner die is rotatable with said extrusion screw, for example being integral therewith.

The rotating die may, however, be driven separately from the extruder screw, thereby allowing for the imposition of a separate speed control on the streams issuing from the extrusion orifices of this die and hence allowing variation at will of the pattern, mesh size, etc. in the product.

The diverting means referred to may conveniently be furnished by devices such as guide rollers, guide bars, constricting bars and rings, conical or other expanding mandrels, reciprocating bodies provided with grooves which receive and shift the streams applied thereto, and so on.

Thus, in a case where the outer die is fixed and the inner die rotatable, the diverting means may comprise a ring coaxial with said orifices and arranged to divert the plastic streams from the outer die into contact with the trailing streams from the inner die. In another instance, in which the inner die is fixed and the outer die rotatable, and the diverting means is a cone coaxial with said dies and tapered towards the latter, said cone being so dimensioned, relatively to the die nozzles, as to receive and conduct the streams from the inner die outwards over the tapered surface thereof into contact with the plastic streams from the outer die.

In these rotary die arrangements, the dies will conveniently be disposed and relatively rotatable about a vertical axis, so that the plastic streams and the tubular structure formed therefrom, move continuously downwards as the extrusion continues, but the method is practicable with the die axes other than vertical.

The above description refers specifically to a tubular product. A plain or web-form product can be produced by employing a like extrusion technique, in which the relative movement between the streams, e.g. the sets of orifices, takes the form of a rectilinear reciprocation.

Thus, in a construction designed to bring this about, one die or set of orifices is rectilinearly reciprocable and the other fixed and disposed below the first die, or first set of orifices, and the diverting or guiding means is a mandrel which is rotatable about a fixed axis in a position in front of said dies to bring the plastc streams into merging contact. The mandrel may be rotatable, so as to reduce the frictional effect and may be grooved to receive and guide one set of filaments passing thereover.

Alternatively, however, the orifices may all be fixed, and the diverting means movable, e.g. reciprocable, in front of said orifices to bring about the required contacts between the plastic streams. In this case, it will be observed the orifices may all be provided in one die or, if more convenient, in a plurality of such dies. Moreover, the diverting means, again, can assume many forms even in this last-mentioned arrangement. In one suitable case, this means comprises a reciprocable mandrel equipped with picker or comb elements for engagement with selected plastic streams to bias them into contact with other such streams in the chosen pattern.

Arrangements of this character are practicable with horizontal, vertical, or other directions of extrusion.

As has been indicated above, the streams must, when they meet, exhibit a degree of softness and flowability (i.e. be of a temperature) permitting the required coalescing and merging between the separate streams on contact. This can sometimes be achieved by appropriate control of the temperature at which the streams leave the extrusion orifices, for instance by appropriate arrangement of the plastic-heating means in the extruder head, and assuming that the diverting or guiding means is sufficiently close to the die orifices, when the plastic strands will retain enough heat to merge satisfactorily at the intersections.

If, however, the said means is positioned at a greater distance from the orifices, the streams may be brought together in a warm atmosphere, e.g. by applying hot air or radiant heat.

In addition the apparatus may include cooling means for receiving the fabricated openwork structure, and take-off means to wind off the fabric through said cooling means. This take-off means may be designed to bias the reticulated plastic structure, so as to confer a required shaping on the meshes or openings in the final product.

The ultimate openwork structures produced may be soft and pliable, or alternatively rigid, according to the type of material used in their manufacture. Strand or filament thickness and pattern and size of the mesh or other openwork may be varied over wide limits. For instance, very fine gauge-like fabrics may be produced and fashioned into garments and soft furnishings; again the method can be used to produce stout structural mesh which can be used in place of metal mesh in many of its applications.

The invention is illustrated by way of example in the accompanying drawings, in which.

Figure 4:
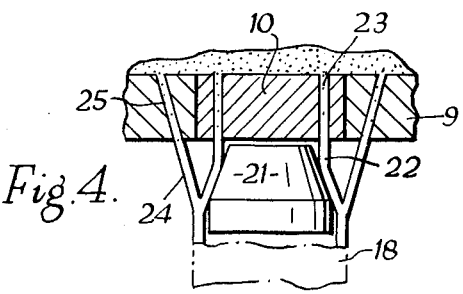
FIGURE 4 is an illustration, similar to that of FIGURE 2 but on a smaller scale, showing a modified diverting means for bringing the streams of plastic into contact.
Figure 5:
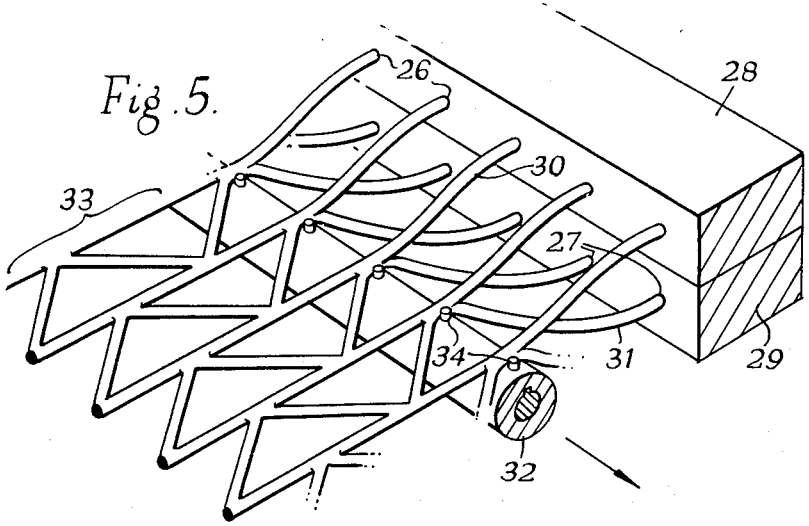
FIGURE 5 is a diagrammatic perspective illustration of the application of the invention to the production of the reticulated structure from horizontal rows of die orifices.
Figure 6:
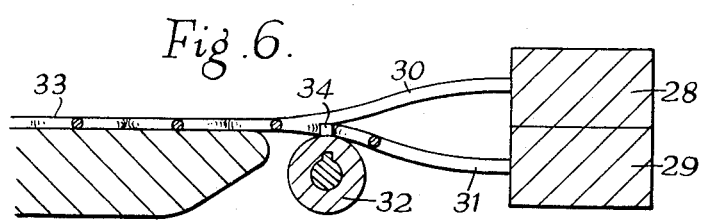
FIGURE 6 is a vertical cross section through the system illustrated in FIGURE 5.
Figure 7:
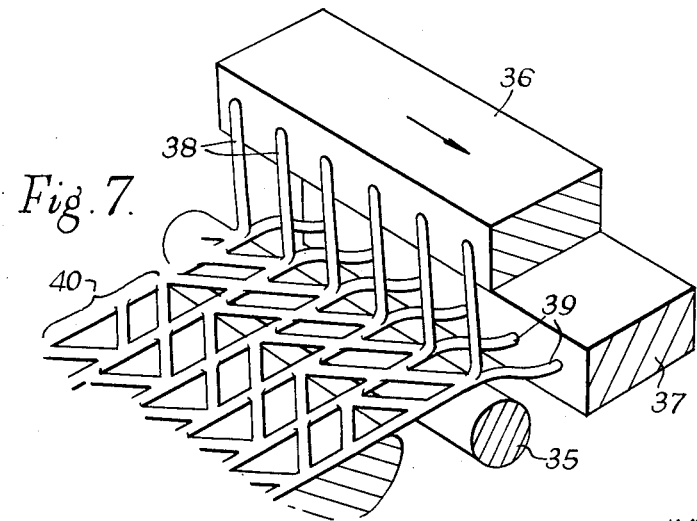
FIGURE 7 is a diagrammatic illustration, corresponding to that of FIGURE 5, but showing a modified method.

As simple examples of structure which can be produced in accordance with this invention, FIGURES 1 to 4 of the accompanying drawings deal with the fabrication of tubular, net-like structures made from plastic filaments, whilst FIGURES 5 to 7 deal with the production of webs of similar types.

Figure 1:
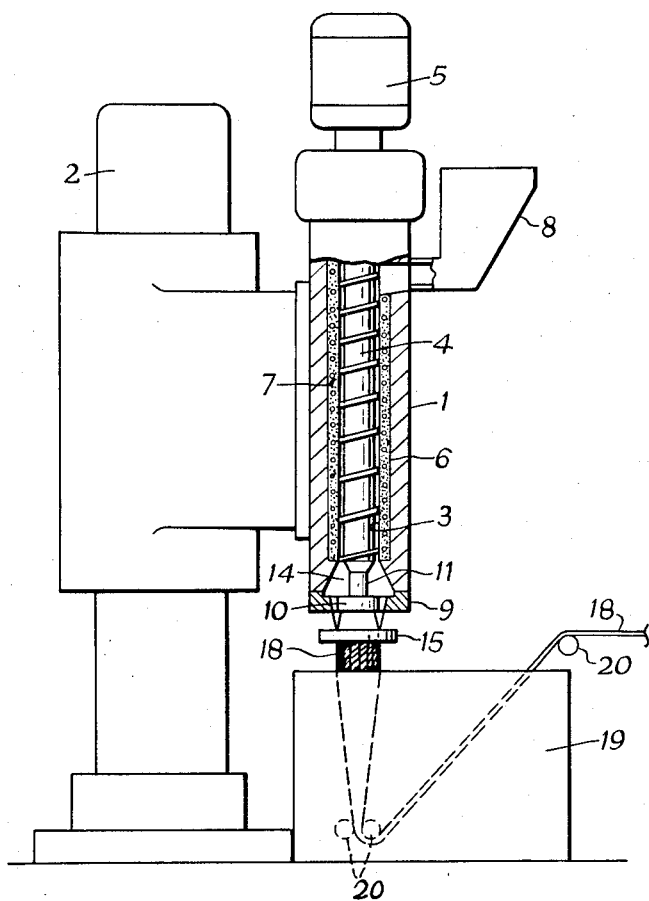
FIGURE 1 is a diagrammatic elevational view of an apparatus used in performance of the method of this invention.
Figure 2:
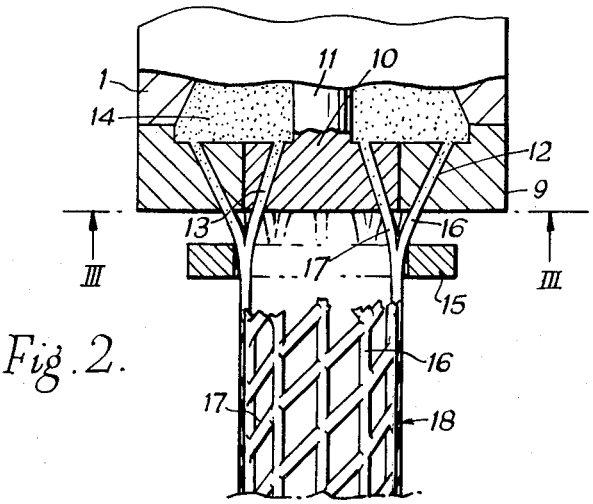
FIGURE 2 is an enlarged view, partly in section, illustrating the lower and die-equipped portion of the extruding head of the apparatus seen in FIGURE 1, and one way in which the invention is carried out.
Figure 3:
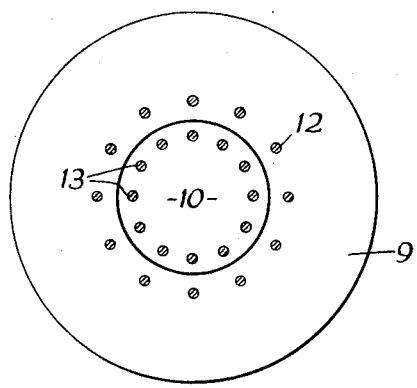
FIGURE 3 is a view on the line III—III of FIGURE 2.

Referring first to FIGURE 1, the apparatus there illustrated diagrammatically comprises a cylindrical and vertically-disposed extruder head 1 which is supported by means of an arm on an upright 2. The casing of the extruder head 1 is formed with a central bore 3 in which rotates a vertical extruder screw 4 driven by a motor 5. The bore 3 has a lining 6 in which heating elements 7 are embedded. A hopper for charging the screw with the solid plastic, prior to feeding and fusion thereof, is depicted at 8.

At its lower end, the cylindrical casing of head 1 is closed by a pair of dies constituted by an outer die ring 9 and an inner die plate 10 fitting closely therein. This latter is integral with a stem 11, in turn secured to, or integral with, the screw 4, whereby the screw and die 10 rotate together about a vertical axis with which the ring 9 is coaxial.

Each of these dies is furnished with a ring of passages, 12 and 13 respectively, for the plastic, these passages being of circular section and being equal in number in the two rings. The passages 12 and 13 in the dies are inclined to the vertical and towards one another in the direction of extrusion. The passages pass completely through the respective dies, opening at the upper face of the die into an annular chamber 14 formed by flaring the bore 3 at its lower end. Thus, plastic fed by the screw reaches the chamber 14 in fluent condition and thence is distributed to all the die passages 12 and 13.

Supported coaxially (by means not shown) below and at a distance from the lower face of the dies 9 and 10 is a guide ring 15 which is of an internal diameter approximately that of the external diameter of the inner die 10. Thus, when the apparatus is in operation, plastic filaments are extruded in two concentric sets from the passages 12 and 13, and the ring 15 engages the outer set of filaments 16 and biases it towards the inner set 17. As the inner die 10 rotates, the filaments 17 issuing therefrom trail round and intermittently contact, merge temporarily with, and then part from successive filaments 16 of the outer set, thereby to produce a reticulated tubular structure, as generally indicated at 18 in FIGURES 1 and 3 of the drawings.

As has already been indicated, means may be provided to maintain the filaments 16 and 17 at the requisite temperature between the time they leave the heated section of the extruder head 1 and the point at which they merge together.

The tubular structure 18 is drawn over downwards into a cooling tank 19 and thence away, by means not shown, over guide rollers 20, by which it is flattened.

FIGURE 4 illustrates a modification of this procedure in which the inner die 10 is fixed and the outer die ring 9 is rotatable. In this example, the diverting means comprises a cone 21 which is arranged coaxially below the ring 10 and spaced therefrom. The cone 21 is dimensioned so that the filaments 22, which in this case are extruded vertically downwards by virtue of the vertical disposition of the passages 23 in the die 10, slide outwards and downwards over the surface of the cone and are thereby brought into contact with the outer set of filaments 24 which are initially inclined inwards by inclined passages 25 in the die ring 9. Here again, one set of filaments, in this case outer filaments 24, are hauled around into contact with successive filaments 22.

The cone 21 can be mounted for vertical adjustment to vary the position and period of contact between the filaments 22 and 24. This provides another variable factor, additional to the other possible variations of speed of die rotation, speed of extrusion, and plastic temperature, and so on referred to above, for modifying the final pattern.

The method of producing a web, as distinct from a tube, which is illustrated in FIGURE 5, also involves the use of two sets of extrusion orifices. These, designated 26 and 27 respectively, are arranged in two rows in upper and lower dies 28 and 29 (or, it could be, one combined die or extruder head).

In this case the two sets of plastic streams 30 and 31, again conveniently in the form of circular-section filaments, are extruded from the two orifice sets in a generally horizontal direction and the filaments of the lower set 31 are biased outwards towards those of the upper set by means of a circular-section mandrel 32 which is mounted in front of, and spaced from, the die orifices.

The mandrel 32 is reciprocated at right angles to the general path of travel of the plastic streams and is equipped so that it will engage the filaments 31 and bias them into contact with filaments 30, thereby to form a patterned web, as shown at 33, beyond the mandrel 32. The means for diverting the filaments 31 in this way may take various forms, for example be represented by grooves or ribs in the surface of the mandrel or, as in the case illustrated, consist of picker fingers 34.

In the arrangement illustrated in FIGURES 5 and 6, the dies, or combined die 28 and 29 have or has been assumed stationary, although it will be appreciated that one or both could alternatively be movable, depending on the pattern required. The mandrel 32 is, however, reciprocated transversely of the web. It is also rotatable to assist travel of the formed web and bring the fingers 34 into contact with the filaments at required times. In addition, or alternatively to a rotational movement the mandrel could be moved up and down to engage the fingers with, or pass them under, the transversely moving filaments, as necessary.

In the modified arrangement illustrated in FIGURE 7 a mandrel 35, similarly positioned to the mandrel 32, is held against movement laterally and one of the dies, in this case the upper die 36, is reciprocated, so that the filaments 38 therefrom, are trailed across those 39 issuing from the set of orifices in the lower die 37. The filaments 39 are guided into contact with the filaments 38 by means of the mandrel 35 which may, for this purpose, be provided with peripheral grooves (not shown). Again the mandrel may be rotatable about its axis.

Depending on the frequency of travel of the die 36 in relation to the rate of extrusion, so the patterned effect in the resultant web can be varied, e.g. producing a form as indicated at 40 in the figure.

We claim:

1. Apparatus for fabricating openwork structures of a thermoplastic material comprising a support; an inner fixed die mounted on the support and formed with a ring of linear extrusion passages terminating with a set of co-planar, parallel extrusion orifices on one side of said fixed die; an outer die concentric with and rotatable about the inner fixed die, the outer die being formed with a further ring of linear extrusion passages concentric with the ring of passages of the fixed die and terminating on one side of the outer die with a set of parallel extrusion orifices co-planar with and laterally spaced from the set of orifices of the inner fixed die; means for supplying fluent thermoplastic material to the dies and the extrusion passages thereof to produce individual and distinct extruded plastic streams through all of the said orifices; means for rotating the outer die about the inner die; and a mechanical guide cone coaxial with and axially spaced from the dies and the orifices thereof, the surface of the cone tapering toward the dies and dimensioned to engage the streams extruded from the orifices of the inner fixed die and direct the said inner die streams toward the moving streams extruded from the outer rotating die for periodic fusion contact therewith.

2. Appartus according to claim 1 wherein the guide cone is axially movable to vary its spacing from the dies and thereby vary the period of fushion contact of the streams from the inner die with the streams of the outer die.

3. Apparatus for fabricating openwork structures of a thermoplastic material comprising a support; a rotatable inner die mounted on the support and formed with a ring of linear extrusion passages terminating with a set of co-planar parallel extrusion orifices on one side of the inner die; an outer die fixed to said support and concentric with the inner rotatable die, the outer die being formed with a ring of linear extrusion passages concentric with the ring of passages of the inner die and terminating on one side of the outer die with a further set of parallel extrusion orifices co-planar with and laterally spaced from the set of orifices of the inner die; means for supplying fluent thermoplastic material to the dies and the extrusion passages thereof to produce separate and distinct extruded plastic streams emerging from the said orifices; means for rotating the inner die within the outer die to produce relative rotational movement therewith; and a mechanical guide ring coaxial with and axially spaced from the dies and the orifices thereof, the inner surface of the ring defining means engaging all of the extruded streams of the outer die and directing them toward the moving streams extruded from the inner rotating die for periodic fusion contact therewith.

4. Apparatus according to claim 3 wherein the support includes an extrusion head, and the means for supplying fluent thermoplastic material comprises a plastic-forward feed screw rotatable in said extrusion head, the inner die being circular and carried by said screw, the inner die rotating means simultaneously rotating the screw and the inner die carried by the screw.

References Cited by the Examiner

UNITED STATES PATENTS

| 2,502,514 | 4/1950 | Ewer | 156—500 |
| 2,919,467 | 1/1960 | Mercer | 18—12 |

FOREIGN PATENTS

| 200,333 | 10/1958 | Austria. |
| 552,251 | 11/1956 | Belgium. |
| 134,532 | 10/1949 | Great Britain. |
| 1,113,015 | 11/1955 | France. |
| 17,549 | 1898 | Great Britain. |
| 182,336 | 3/1950 | Japan. |

EARL M. BERGERT, *Primary Examiner.*

W. J. STEPHENSON, CARL F. KRAFFT, JOSEPH REBOLD, *Examiners.*